(12) United States Patent
Taylor et al.

(10) Patent No.: US 6,666,130 B2
(45) Date of Patent: Dec. 23, 2003

(54) BAFFLE OPERATED LIQUID HEATING AND DISPENSING SYSTEM FOR A SINGLE SERVE BEVERAGE BREWER

(75) Inventors: Jon Taylor, Groton, MA (US); Jason F. Lipman, Acton, MA (US)

(73) Assignee: Keurig, Incorporated, Wakefield, MA (US)

( * ) Notice: Subject to any disclaimer, the term of this patent is extended or adjusted under 35 U.S.C. 154(b) by 44 days.

(21) Appl. No.: 10/113,187

(22) Filed: Apr. 1, 2002

(65) Prior Publication Data

US 2002/0144602 A1 Oct. 10, 2002

Related U.S. Application Data

(60) Provisional application No. 60/281,954, filed on Apr. 6, 2001, and provisional application No. 60/284,403, filed on Apr. 17, 2001.

(51) Int. Cl.$^7$ ................................................. A47J 31/32
(52) U.S. Cl. ........................ 99/305; 99/283; 99/302 R; 222/146.5; 222/394
(58) Field of Search ......................... 99/283, 305, 282, 99/280, 302 R, 300; 222/146.5, 394, 405, 438; 137/206, 209

(56) References Cited

U.S. PATENT DOCUMENTS 4,662,271 A    5/1987  Woltermann ................. 99/299
5,111,740 A    5/1992  Klein ........................... 99/295
5,307,733 A  * 5/1994  Enomoto ...................... 99/280
6,082,247 A  * 7/2000  Beaulieu .................... 99/302 R

FOREIGN PATENT DOCUMENTS

JP         11-178717         6/1999

* cited by examiner

Primary Examiner—Reginald L. Alexander
(74) Attorney, Agent, or Firm—Samuels, Gauthier & Stevens

(57) ABSTRACT

A beverage brewer comprises a storage tank adapted to contain a supply of liquid, and a metering chamber structured and arranged to be filled with a metered amount of liquid received from the storage tank via an inlet in communication therewith. A brewing chamber is structured and arranged to receive a beverage filter cartridge containing a dry beverage medium. A baffle in the storage tank is shiftable from an open position accommodating liquid flow between the storage tank and the metering chamber via its inlet to a closed position preventing such flow and isolating the metering chamber from the storage tank. During a brewing cycle, liquid is delivered from the thus isolated metering chamber to the brewing chamber for combination with the beverage medium contained in the filter cartridge. At the conclusion of the brewing cycle, the baffle is returned to its open position, thereby allowing the metering chamber to be refilled with liquid received from the storage tank via its inlet.

18 Claims, 6 Drawing Sheets

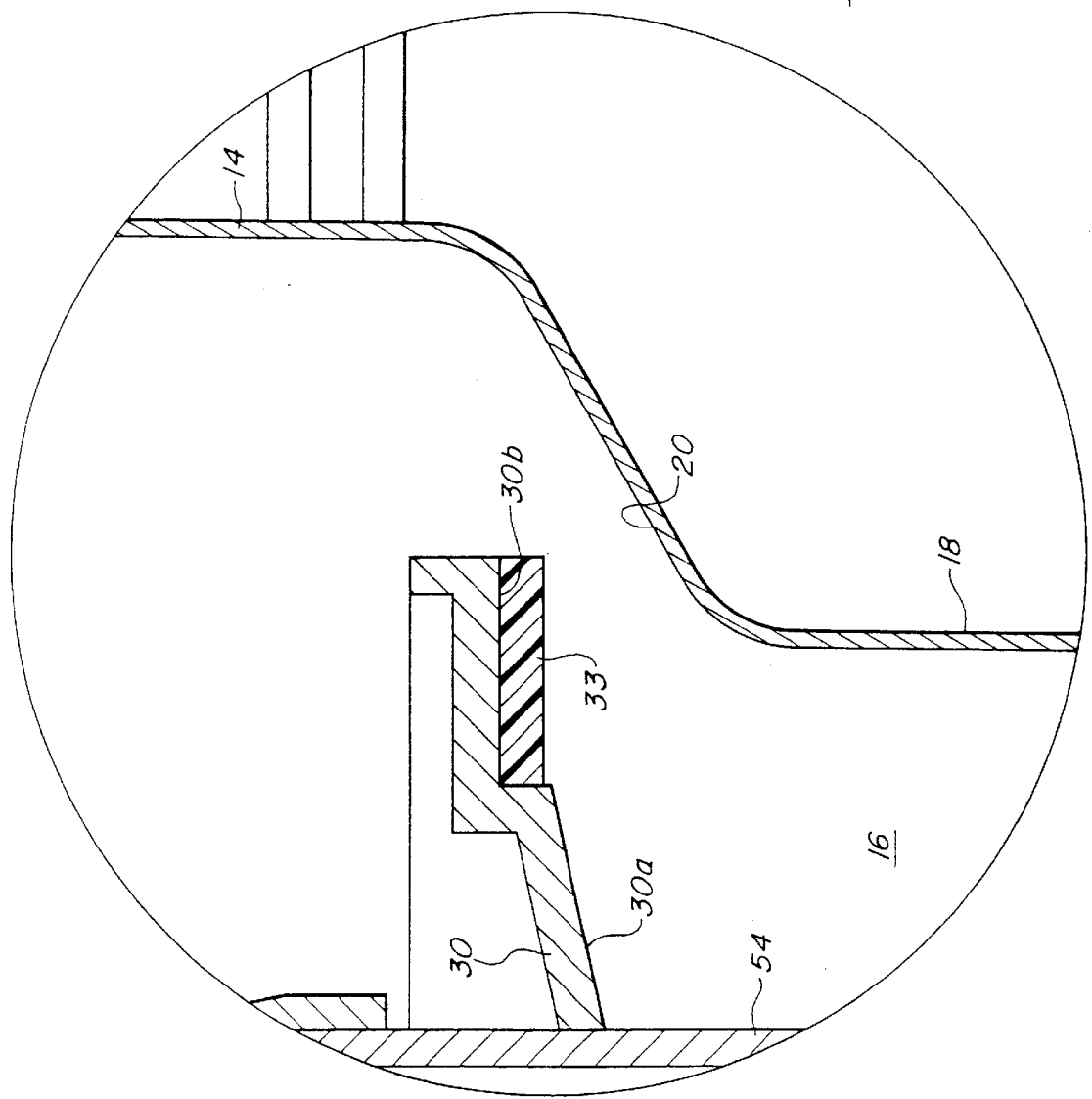

BAFFLE OPERATED LIQUID HEATING AND DISPENSING SYSTEM FOR A SINGLE SERVE BEVERAGE BREWER

REFERENCE TO RELATED APPLICATIONS

This application claims priority of provisional patent application Ser. No. 60/281,954 filed Apr. 6, 2001 and provisional patent application Ser. No. 60/284,403 filed Apr. 17, 2001.

BACKGROUND DISCUSSION

1. Field of the Invention

This invention relates generally to single serve beverage brewers, and is concerned in particular with an improved baffle operated system for rapidly heating and repeatedly dispensing the metered amounts of heated liquid required to effect successive brewing cycles.

2. Description of the Prior Art

U.S. Pat. No. 6,082,247 (Beaulieu) discloses a known system for dispensing metered amounts of heated liquid to the brewing chamber of a single serve brewer. In this system, an inlet opening between a storage tank of heated water and a metering chamber is selectively opened and closed by a ball contained in the metering chamber. The ball is gravitationally seated in a closed position blocking the inlet opening when the metering chamber is pressurized during a brewing cycle. At the conclusion of the brewing cycle, the metering chamber is vented and the ball is hydraulically dislodged from the inlet opening by an inflow of liquid from the storage tank.

While this system operates in a generally satisfactory manner, sealing problems have occasionally been encountered due to a build up of mineral deposits and the like on the ball surface or the meter cup sealing surface. In addition, delays are sometimes encountered between successive brew cycles due to the time required to reheat the contents of the storage tank to the temperature required for optimum brewing efficiency.

SUMMARY OF THE INVENTION

One objective of the present invention if to avoid or at least significantly minimize the above noted prior art sealing problems by providing an improved baffle operated system for repeatedly dispensing the metered amounts of liquid required to effect successive brew cycles.

A companion objective of the present invention is to provide a more rapid heating of liquid received in the metering chamber, as well as a more gradual and uniform heating of liquid in the storage tank.

These and other objectives and advantageous features of the present invention will now be described in further detail with reference to the accompanying drawings, wherein:

BRIEF DESCRIPTION OF THE DRAWINGS

FIGS. 3A and 3B are enlarged views of the circled areas in FIGS. 1 and 2;

DETAILED DESCRIPTION OF PREFERRED EMBODIMENT

Figure 1:
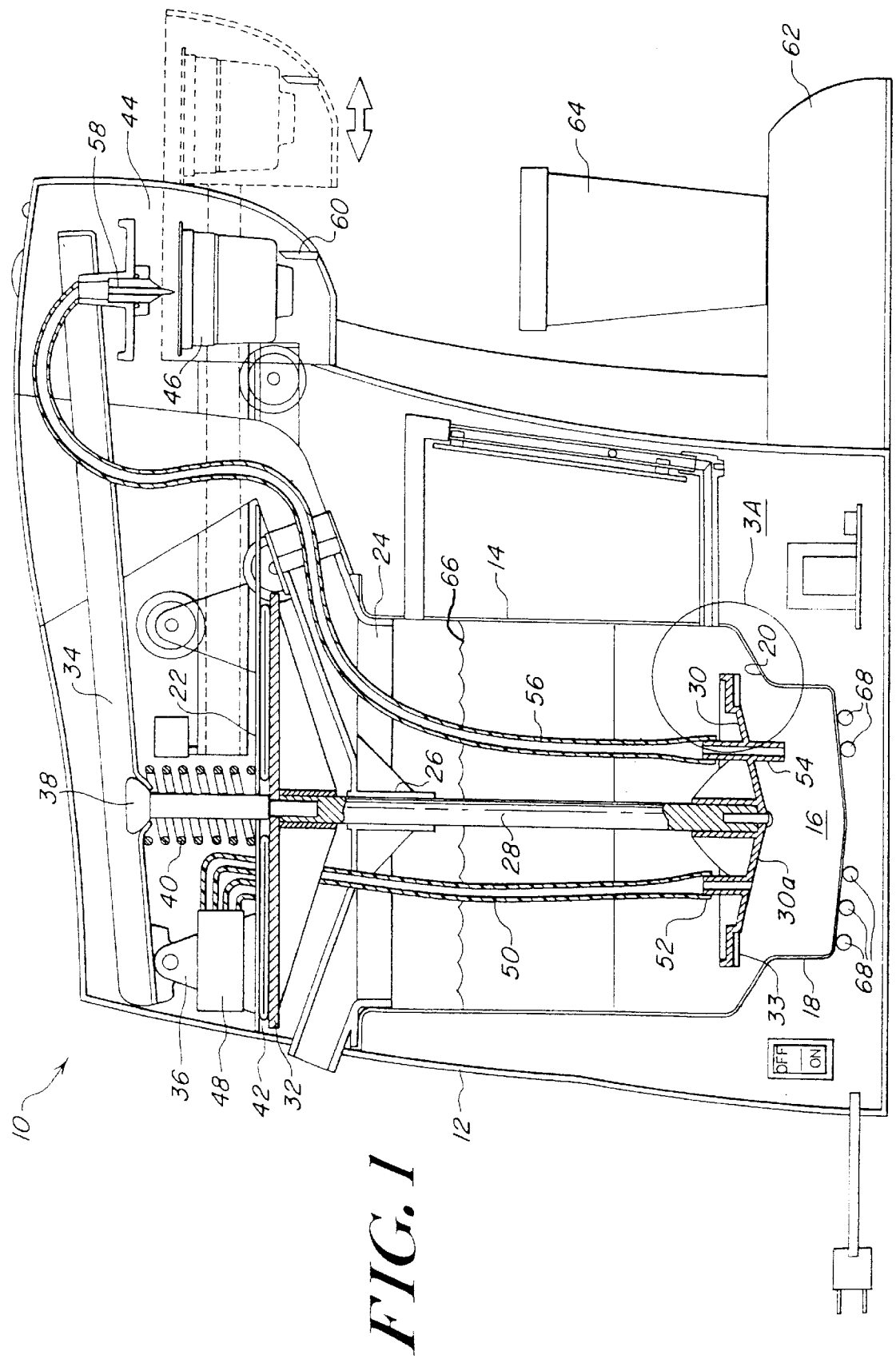
FIG. 1 is a vertical sectional view taken through a single serve brewer embodying a liquid dispensing system in accordance with the present invention, with the dispensing system shown in a "ready" state prior to commencement of a brew cycle.

With reference initially to FIG. 1, a single serve brewer 10 includes a housing 12 enclosing a liquid storage tank 14. The tank has a lower metering chamber 16 formed by a reduced diameter cup-shaped bottom 18 integrally joined to the larger diameter tank side wall at a circular sealing surface defining a seat 20.

A fixed internal structure includes a horizontal platform 22 and struts 24 supporting a vertically disposed sleeve bearing 26 aligned centrally with respect to the tank 14 and its cup-shaped bottom 18.

Figure 3B:
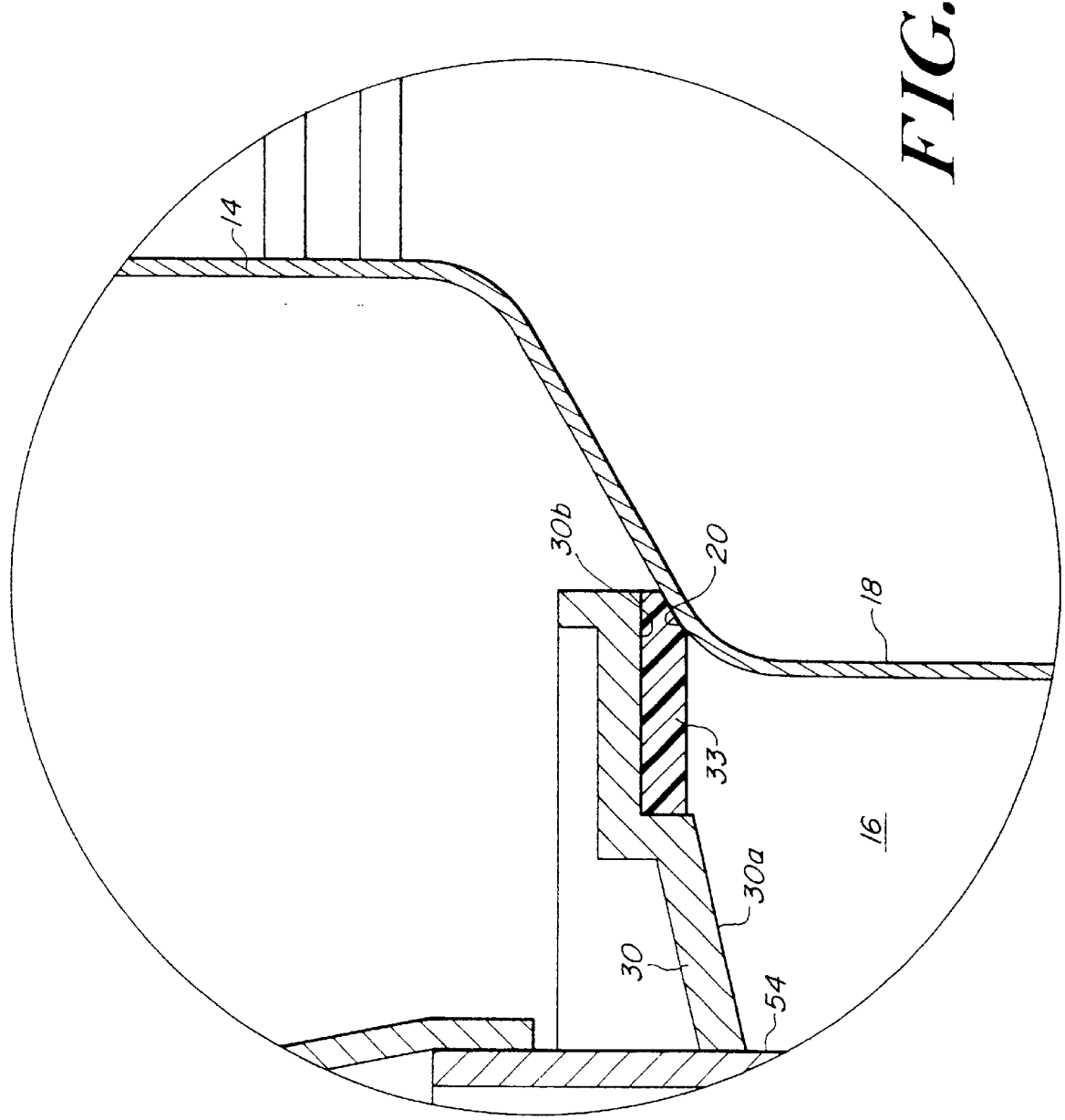

A vertically reciprocal shaft 28 extends through the sleeve bearing 26. The shaft carries a circular baffle 30 at its lower end, and a circular plate 32 disposed beneath the platform 22. With additional reference to FIG. 3A, it will be seen that the lower surface of the baffle 30 is configured with a downwardly protruding central conical area 30a surrounded by a flat annular horizontal shelf 30b. A resilient compressible gasket 33 is secured to the shelf at a location overlying the seat 20.

An arm 34 is pivotally mounted on a bracket 36 carried by the platform 22. Arm 34 is connected to the shaft 28 by a pin 38. A coiled spring 40 surrounds the pin 38 between the arm 34 and the upper surface of platform 22, and an inflatable bladder 42 is positioned between the bottom surface of the platform 22 and the plate 32.

The distal end of arm 34 extends into a brewing chamber 44 designed to accept a single serve beverage filter cartridge 46 of the type described, for example, in copending patent application Ser. No. 09/782,622 filed Feb. 13, 2001, the description of which is herein incorporated by reference in its entirety.

An air pump 48 on platform 22 is connected to the bladder 42, and is also connected via a flexible hose 50 to a port 52 in the baffle 30. A metering tube 54 extends through the baffle 30 into the chamber 16. The metering tube 54 is connected via a second flexible hose 56 to a depending tubular probe 58 carried by the arm 34. A second tubular probe 60 underlies the cartridge 46 and opens downwardly above an exterior shelf 62 configured and dimensioned to support a cup 64 or other like receptacle.

The tank 14 stores a supply of liquid 66 heated by an electrical heating element 68 underlying the cup-shaped bottom 18.

Figure 2:
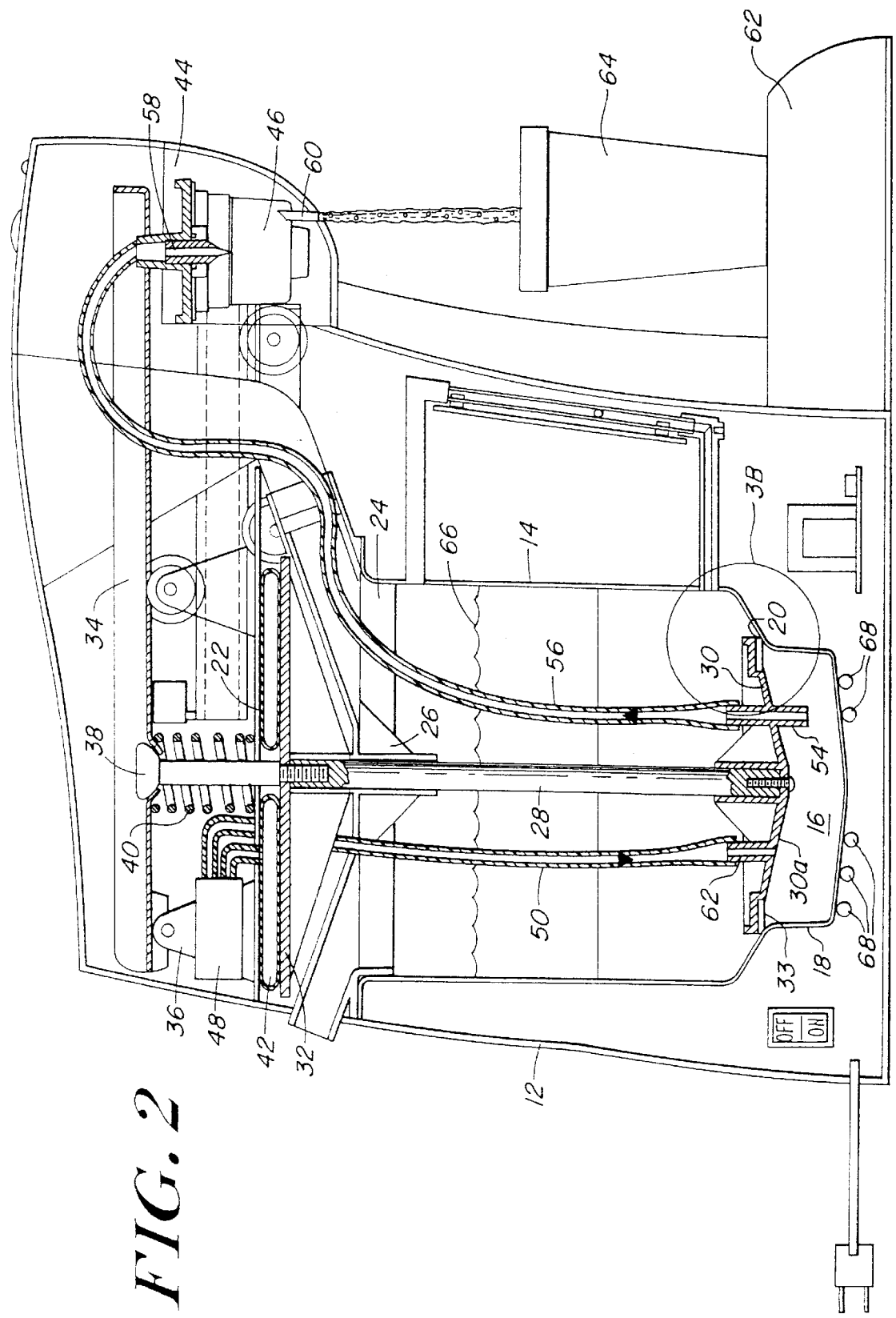
FIG. 2 is a view similar to FIG. 1 showing the dispensing system in operation during a brew cycle.

During a brewing cycle, a control system including appropriate valves and circuitry (not shown) operates the air pump 48 to pneumatically effect the following sequence:

a) As shown in FIG. 2, the bladder 42 is inflated, pushing shaft 28 and baffle 30 downwardly, until the gasket 33 is pressed against the seat 20 to seal off the liquid in the metering chamber 16 from the remainder of the tank 14. Downward movement of the shaft 28 also produces downward pivotal movement of arm 34 against the resistance of the spring 40, which in turn results in the lid and bottom of the cartridge 46 in brewing chamber 44 being pierced respectively by probes 58, 60.

b) Compressed air is then fed into the metering chamber 16 via hose 50, causing a metered amount of liquid to be expelled and fed to the cartridge 46 via hose 56 and the tubular probe 58. The resulting heated liquid combines with a beverage medium in the cartridge to produce brewed beverage that exits via the probe 60 and is received in the underlying cup 64.

c) At the conclusion of the brew cycle, the pump 46 is deactivated and the system is vented and returned to the condition shown in FIG. 1. The bladder 42 is collapsed under the return force of spring 40 causing an upward displacement of the shaft 28. The baffle 30 is thus raised above the seat 20, allowing air in the chamber 16 to be displaced by liquid in the tank 14. The return force of the spring 40 also pivots arm 34 upwardly, which in turn removes the probe 58 from the cartridge 46.

The spent cartridge 46 may then be removed from the brewing chamber, readying the system for the next cycle.

Figure 4:
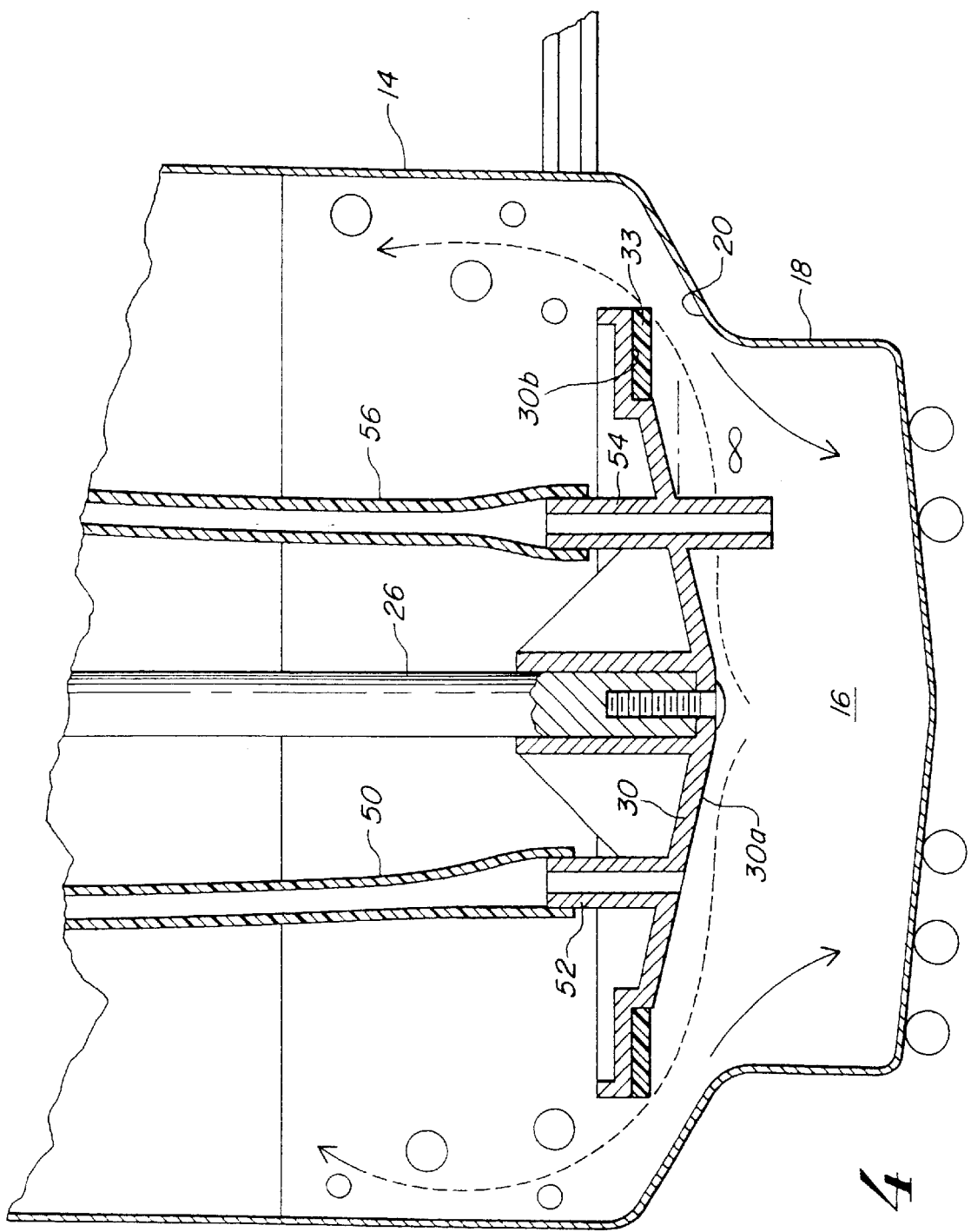
FIG. 4 is an enlarged view diagrammatically depicting air being vented from and heated liquid flowing into the metering chamber as the baffle is raised at the conclusion of a brew cycle.

With reference to FIG. 4, it will be seen that the conical area 30a has an angle of taper α between about 5 to 20°, with the preferred range being between about 8 to 12°.

With this arrangement, as shown in FIG. 4, upon elevation of the baffle at the conclusion of a brew cycle, the conical central area 30a assists in uniformly distributing the escaping air (diagrammatically depicted by broken arrows) to and around the entire periphery of the baffle. The escaping air is displaced by a counterflow of water (diagrammatically depicted by solid arrows) which enters the metering chamber around the entire periphery of the baffle.

Figure 5:
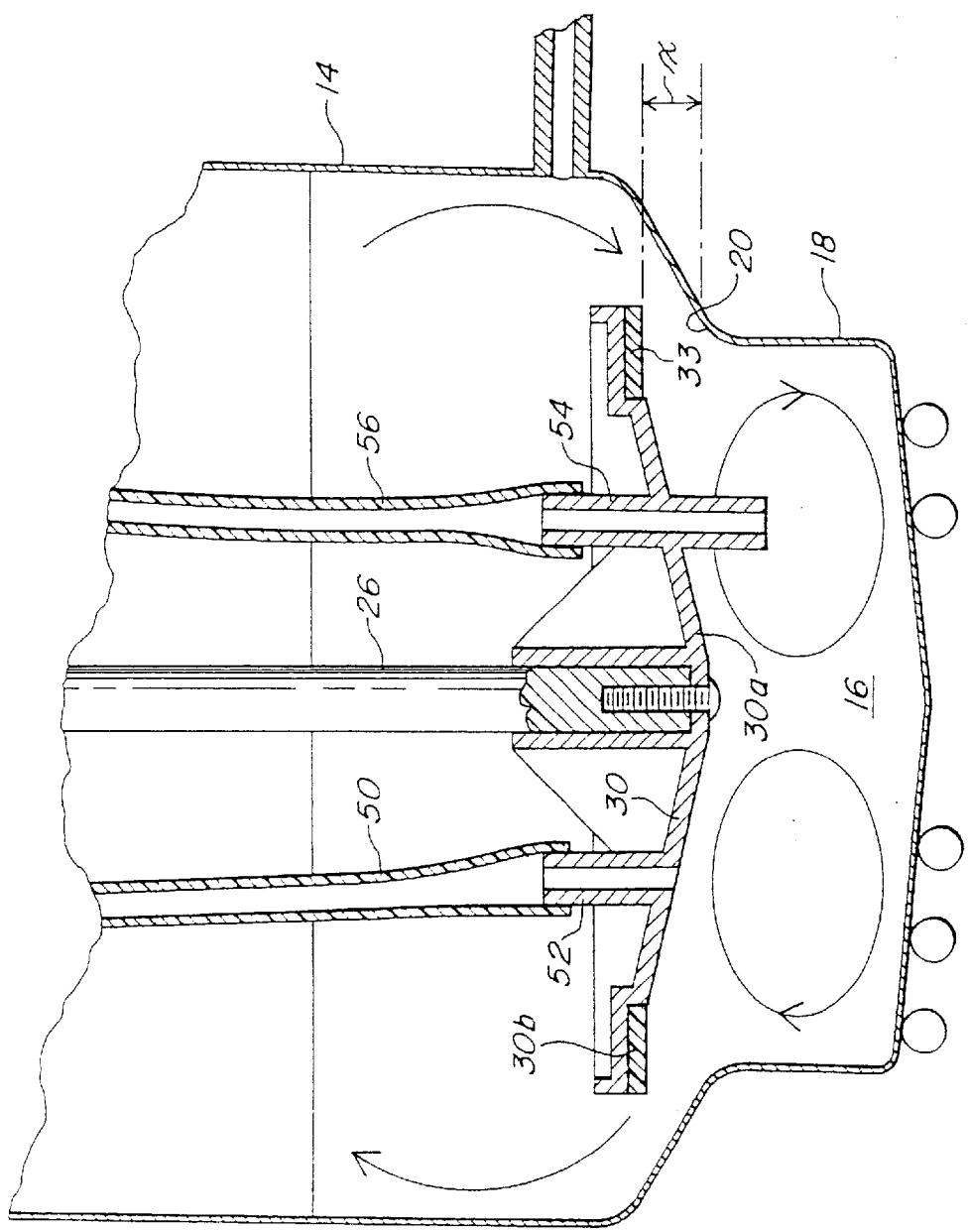
FIG. 5 is a view similar to FIG. 4 diagrammatically depicting water circulation after the metering chamber has been refilled.

As shown in FIG. 5, when the baffle 30 is in its fully elevated position, it coacts with the seat 20 to define a gap "x" which measures between about 2 to 10% of the baffle diameter "D", and preferably between about 3 to 5% of the baffle diameter. The baffle induces a thermal stratification between the metering chamber 16 and the remainder of the tank. As indicated diagrammatically by the solid arrows, the gap "x" serves to control convective flow and heat transfer between the metering chamber and the remainder of the tank, while encouraging a recirculating convective flow within the metering chamber. This insures both a rapid heating of water received in the metering chamber and a more gradual and uniform heating of water in the remainder of the tank.

Various modifications may be made to the embodiment herein disclosed. For example, the shaft 28 may be vertically reciprocated by other means, e.g., a motor-driven gear drive, or manual operation of the arm 34. The metering chamber 16 and seat 20 may be formed on a separate cup-shaped insert received in the tank, rather than being formed integrally with the tank.

Internal rather than external heating elements could be employed to heat the liquid in the storage tank. Other tank shapes with for example square or rectangular cross sections could employ comparably shaped baffles. Multiple air pumps could be employed to inflate the bladder 42 and to pressurize the metering chamber 16.

It is our intention to cover these and any other changes and modifications that do not depart from the spirit and scope of the invention as defined by the appended claims.

We claim:

1. A beverage brewer comprising:
   a storage tank adapted to contain a supply of liquid;
   a metering chamber structured and arranged to be filled with a metered amount of said liquid received from said storage tank via an inlet in communication therewith;
   a brewing chamber structured and arranged to receive a beverage filter cartridge containing a beverage medium;
   a baffle movably arranged in said storage tank;
   actuating means operable in a first mode to shift said baffle from an open position accommodating liquid flow between said storage tank and said metering chamber via said inlet, to a closed position preventing said flow and isolating said metering chamber from said storage tank;
   connecting means for establishing a connection between said metering chamber and said brewing chamber; and
   dispensing means operable during a brewing cycle to deliver liquid from the thus isolated metering chamber via said connecting means to said brewing chamber for combination with the beverage medium contained in said filter cartridge, said actuating means being operable in a second mode at the conclusion of said brewing cycle to shift said baffle to said open position, thereby allowing said metering chamber to be refilled with liquid received from said storage tank via said inlet.

2. The beverage brewer of claim 1 wherein said storage tank has a cylindrical side wall, and said metering chamber is formed as a reduced diameter cup-shaped bottom of said storage tank.

3. The beverage brewer of claim 2 wherein said cup-shaped bottom is joined to said cylindrical side wall by a circular sealing surface surrounding said inlet.

4. The beverage brewer of claim 1 wherein said actuating means is pneumatically driven in said first mode.

5. The beverage brewer of claim 1 or 4 wherein said actuating means is resiliently driven in said second mode.

6. The beverage brewer of claim 1 wherein said connecting means communicates with said metering chamber via a port extending through said baffle.

7. The beverage brewer of claim 1 wherein said dispensing means is operable during said brewing cycle to pneumatically pressurize the thus isolated brewing chamber.

8. The beverage brewer of claim 1 wherein said baffle is carried on a shaft supported for vertical reciprocal movement between said open and closed positions.

9. The beverage brewer of claim 8 further comprising a horizontal platform overlying and fixed with respect to said storage tank, said vertical shaft extending through and being vertically reciprocal with respect to said platform, and a plate secured to said shaft beneath said platform, said actuating means including a bladder interposed between said platform and said plate, said bladder being pneumatically inflatable in said first mode to axially lower said shaft with an accompanying shifting of said baffle from said open to said closed position.

10. The beverage brewer of claim 9 further comprising an arm arranged above said platform, said arm being pivotally supported on said platform and having a distal end extending into said brewing chamber, a tubular inlet probe carried by the distal end of said arm, and means for connecting said arm to said shaft, whereby an axial lowering of said shaft is accompanied by a pivotal lowering of the distal end of said arm, causing said inlet probe to pierce a beverage filter cartridge received in said brewing chamber, the said dispensing means being operable via said probe to deliver liquid to the interior of the thus pierced beverage cartridge.

11. The beverage brewer of claim 1 wherein a circular lower surface of said baffle includes a central downwardly protruding conical area surrounded by a horizontal annular ledge.

12. The beverage brewer of claim 11 wherein said conical area has an angle of taper of between about 5–20°.

13. The beverage brewer of claim 11 wherein said conical area has an angle of taper of between about 8–12°.

14. The beverage brewer of claim 11 wherein a circular seat is defined at a juncture between said storage tank and said metering chamber, and a gasket is provided on said annular ledge, said gasket being structured and dimensioned to coact in a sealing relationship with said seat when said baffle is in said closed position.

15. The beverage brewer of claim 14 wherein when said baffle is in said open position, said gasket is spaced from said circular seat by a gap measuring between about 2–10% of the diameter of said baffle.

16. The beverage brewer of claim 15 wherein said gap measures between about 3–5% of the diameter of said baffle.

17. A beverage brewer comprising:

a storage tank adapted to contain a supply of liquid;

a metering chamber structured and arranged to be filled with a metered amount of said liquid received from said storage tank via an inlet in communication therewith;

a brewing chamber structured and arranged to received a beverage filter cartridge containing a beverage medium;

a baffle movably arranged in said storage tank;

pneumatically actuated means operable in a first mode to shift said baffle from an open position accommodating liquid flow between said storage tank and said metering chamber via said inlet, to a closed position preventing said flow and isolating said metering chamber from said storage tank;

connecting means for establishing a connection between said metering chamber and said brewing chamber;

dispensing means pneumatically operable during a brewing cycle to deliver liquid from the thus isolated metering chamber via said connecting means to said brewing chamber for combination with the beverage medium contained in said filter cartridge, and;

resiliently actuated means operable in a second mode at the conclusion of said brewing cycle to shift said baffle to said open position, thereby allowing said metering chamber to be refilled with liquid received from said storage tank via said inlet.

18. A beverage brewer comprising:

a storage tank adapted to contain a supply of liquid;

a metering chamber structured and arranged to be filled with a metered amount of said liquid received from said storage tank via an inlet in communication therewith, said storage tank and said metering chamber coacting at a juncture therebetween to define a seat;

a brewing chamber structured and arranged to received a beverage filter cartridge containing a beverage medium;

a baffle movably arranged in said storage tank said baffle having a downwardly facing conical central area surrounded by a sealing gasket;

actuating means operable in a first mode to shift said baffle from an open position accommodating liquid flow between said storage tank and said metering chamber via said inlet, to a closed position urging said gasket against said seat to prevent said flow and to isolate said metering chamber from said storage tank;

connecting means for establishing a connection between said metering chamber and said brewing chamber;

dispensing means operable during a brewing cycle to deliver liquid from the thus isolated metering chamber via said connecting means to said brewing chamber for combination with the beverage medium contained in said filter cartridge, said actuating means being operable in a second mode at the conclusion of said brewing cycle to shift said baffle to said open position, thereby allowing said metering chamber to be refilled with liquid received from said storage tank via said inlet.

* * * * *